(12) United States Patent
Nagino et al.

(10) Patent No.: US 10,450,675 B2
(45) Date of Patent: Oct. 22, 2019

(54) ULTRAFINE FIBER PRODUCTION METHOD AND PRODUCTION DEVICE

(71) Applicant: Panasonic Intellectual Property Management Co., Ltd., Osaka (JP)

(72) Inventors: Toshifumi Nagino, Osaka (JP); Noboru Masuda, Nara (JP); Motoi Hatanaka, Kumamoto (JP); Yoshie Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

(21) Appl. No.: 15/501,641

(22) PCT Filed: Oct. 6, 2015

(86) PCT No.: PCT/JP2015/005073
§ 371 (c)(1),
(2) Date: Feb. 3, 2017

(87) PCT Pub. No.: WO2016/113782
PCT Pub. Date: Jul. 21, 2016

(65) Prior Publication Data
US 2017/0233894 A1 Aug. 17, 2017

(30) Foreign Application Priority Data
Jan. 14, 2015 (JP) ................ 2015-005158

(51) Int. Cl.
*B29C 48/05* (2019.01)
*D01D 5/084* (2006.01)
(Continued)

(52) U.S. Cl.
CPC .............. *D01D 5/084* (2013.01); *B29C 37/00* (2013.01); *B29C 48/0018* (2019.02);
(Continued)

(58) Field of Classification Search
None
See application file for complete search history.

(56) References Cited

U.S. PATENT DOCUMENTS

| 4,937,020 A | 6/1990 | Wagner et al. |
| 5,672,415 A | 9/1997 | Sawyer et al. |

(Continued)

FOREIGN PATENT DOCUMENTS

| JP | 61-055211 | 3/1986 |
| JP | 1-213406 | 8/1989 |

(Continued)

OTHER PUBLICATIONS

International Search Report of PCT application No. PCT/JP2015/005073 dated Dec. 15, 2015.

(Continued)

*Primary Examiner* — Monica A Huson
(74) *Attorney, Agent, or Firm* — Wenderoth, Lind & Ponack, L.L.P.

(57) ABSTRACT

An ultrafine fiber production device has a first heating unit, a nozzle unit, a hot air heating unit, a hot air blowing unit, a second heating unit, and a fiber collecting unit. The first heating unit melts a thermoplastic resin. The nozzle unit discharges the thermoplastic resin melted by the first heating unit. The hot air blowing unit performs fiber forming by blowing high-temperature gas produced by the hot air heating unit to the melted thermoplastic resin discharged by the nozzle unit and by extending the thermoplastic resin. The second heating unit further heats, extends, and fines produced fibers. The fiber collecting unit collects the thermoplastic resin in a fibrous form which is fined by the second heating unit.

11 Claims, 5 Drawing Sheets

(51) Int. Cl.
*B29C 48/00* (2019.01)
*B29C 48/80* (2019.01)
*B29C 48/86* (2019.01)
*B29C 37/00* (2006.01)
*D01D 5/098* (2006.01)
*D01D 10/02* (2006.01)
*B29K 23/00* (2006.01)
*B29L 31/00* (2006.01)

(52) U.S. Cl.
CPC ............ *B29C 48/05* (2019.02); *B29C 48/802* (2019.02); *B29C 48/865* (2019.02); *D01D 5/0985* (2013.01); *D01D 10/02* (2013.01); *B29K 2023/12* (2013.01); *B29L 2031/731* (2013.01)

(56) References Cited

U.S. PATENT DOCUMENTS

| | | | |
|---|---|---|---|
| 8,870,559 | B2 | 10/2014 | Oyamada et al. |
| 2004/0102122 | A1 | 5/2004 | Boney et al. |
| 2007/0090555 | A1 | 4/2007 | Roettger et al. |
| 2008/0160861 | A1 | 7/2008 | Berrigan et al. |
| 2008/0220161 | A1 | 9/2008 | Sommer et al. |
| 2009/0186548 | A1 | 7/2009 | Rock et al. |
| 2011/0285065 | A1 | 11/2011 | Koyama |
| 2012/0139153 | A1 | 6/2012 | Oyamada et al. |
| 2013/0122771 | A1 | 5/2013 | Matsubara et al. |

FOREIGN PATENT DOCUMENTS

| | | |
|---|---|---|
| JP | 8-081817 | 3/1996 |
| JP | 8-260233 | 10/1996 |
| JP | 2001-288667 | 10/2001 |
| JP | 2006-507426 | 3/2006 |
| JP | 2007-31876 | 2/2007 |
| JP | 2010-285720 | 12/2010 |
| JP | 2011-241509 | 12/2011 |
| JP | 2013-185272 | 9/2013 |
| JP | 2014-088639 | 5/2014 |
| JP | 2015-028227 | 2/2015 |
| WO | 2012/014501 | 2/2012 |

OTHER PUBLICATIONS

Extended European Search Report dated Dec. 5, 2017 in corresponding European patent application No. 15877741.7.
English Translation of Chinese Search Report dated Dec. 3, 2018 in Chinese Patent Application No. 201580040039.9.

ULTRAFINE FIBER PRODUCTION METHOD AND PRODUCTION DEVICE

CROSS-REFERENCE TO RELATED APPLICATIONS

This application is a U.S. national stage application of the PCT International Application No. PCT/JP2015/005073 filed on Oct. 6, 2015, which claims the benefit of foreign priority of Japanese patent application No. 2015-005158 flied on Jan. 14, 2015, the contents all of which are incorporated herein by reference.

TECHNICAL FIELD

The present invention relates to an ultrafine fiber production method and an ultrafine fiber production device for producing an ultrafine fiber assembly.

BACKGROUND ART

A melt-blown method is a melt spinning method for obtaining a fiber assembly from fibers extruded by melting a thermoplastic raw resin. This method employs a melt spinning device having a row of nozzle holes disposed in a row at intervals in a width direction in order to form the fibers by blowing a melted raw resin, and a pair of slits disposed on both sides of the row of the nozzle holes in order to blow hot air. Then, the blown hot air comes into direct contact with melted resin blown from the row of the nozzle holes. Ultrafine fibers are produced while fine fiber forming is performed by a force to crush blown melted resin. The ultrafine fibers are blown to a fiber collecting unit disposed to face the row of the nozzle holes, and are integrated so as to produce an ultrafine fiber assembly.

In a production device of this ultrafine fiber assembly various schemes are introduced in order to efficiently perform fine fiber forming on the fibers. For example, in a device disclosed in PTL 1, a slit for blowing second hot air is disposed on both sides of the row of the nozzle holes for blowing hot air. The blown second hot air is introduced so as to join a distal end of the row of the nozzle holes. The ultrafine fibers are produced while fine fiber forming is performed. In addition, PTL 2 discloses a method for obtaining the ultrafine fibers by disposing a second heating device independent of a heating device for melting a thermoplastic resin, immediately below a spinning nozzle.

CITATION LIST

Patent Literature

PTL 1: Japanese Patent Unexamined Publication No. 2014-88639
PTL 2: Japanese Patent Unexamined Publication No. 8-81817

SUMMARY OF THE INVENTION

According to the present invention, there is provided an ultrafine fiber production method and an ultrafine fiber production device in which a large amount of ultrafine fibers having a uniform fiber diameter can be obtained in an easy and stable state.

According to an aspect of the present invention, an ultrafine fiber production device has a first heating unit, a nozzle unit, a hot air heating unit, a hot air blowing unit, a second heating unit, and a fiber collecting unit. The first heating unit melts a thermoplastic resin. The nozzle unit discharges the thermoplastic resin melted by the first heating unit. The hot air heating unit produces high-temperature gas. The hot air blowing unit performs fiber forming by blowing the high-temperature gas produced by the hot air heating unit to the melted thermoplastic resin discharged by the nozzle unit and by extending the thermoplastic resin. The second heating unit has a through-hole which allows the thermoplastic resin subjected to fiber forming by the hot air blowing unit to pass through for heating. Then, the thermoplastic resin subjected to fiber forming is heated and further fined when passing through the through-hole. The fiber collecting unit collects the thermoplastic resin in a fibrous form which is fined by the second heating unit.

According to another aspect of the present invention, in an ultrafine fiber production method, a thermoplastic resin is first melted. Fiber forming is performed by discharging the melted thermoplastic resin from a nozzle unit and by blowing high-temperature gas to the melted thermoplastic resin discharged by the nozzle unit and by extending the melted thermoplastic resin. The thermoplastic resin subjected to fiber forming in this way is heated. The thermoplastic resin is further fined and collected.

As described above, in the ultrafine fiber production device and the ultrafine fiber production method according to the aspects of the present invention, fibrously melted resin discharged from the nozzle unit is not vibrated, and the melted resin is not gasified by the second heating unit. Therefore, an ultrafine fiber having a thin and uniform fiber diameter can be produced from the fibrously melted resin discharged from the nozzle unit without any break in an easy and stable state.

DESCRIPTION OF EMBODIMENTS

Prior to description of an embodiment according to the present invention, problems in the related art will be described briefly. According to a technique disclosed in PTL 1, hot air is directly blown to fibrously melted resin extruded from a nozzle hole, thereby generating a turbulent flow. Consequently, a flow of the melted resin is disturbed and vibrated. Since this vibration is generated, fibers cannot be extended in a stable state, thereby causing increased fiber diameter variation. In addition, according to a technique disclosed in PTL 2, a second heating device is located immediately below a spinning nozzle. Accordingly, the fibrously melted resin extruded from the spinning nozzle is likely to be gasified, and thus, fine fiber forming cannot be stably performed.

Hereinafter, an embodiment according to the present invention will be described with reference to the drawings.

Figure 1:
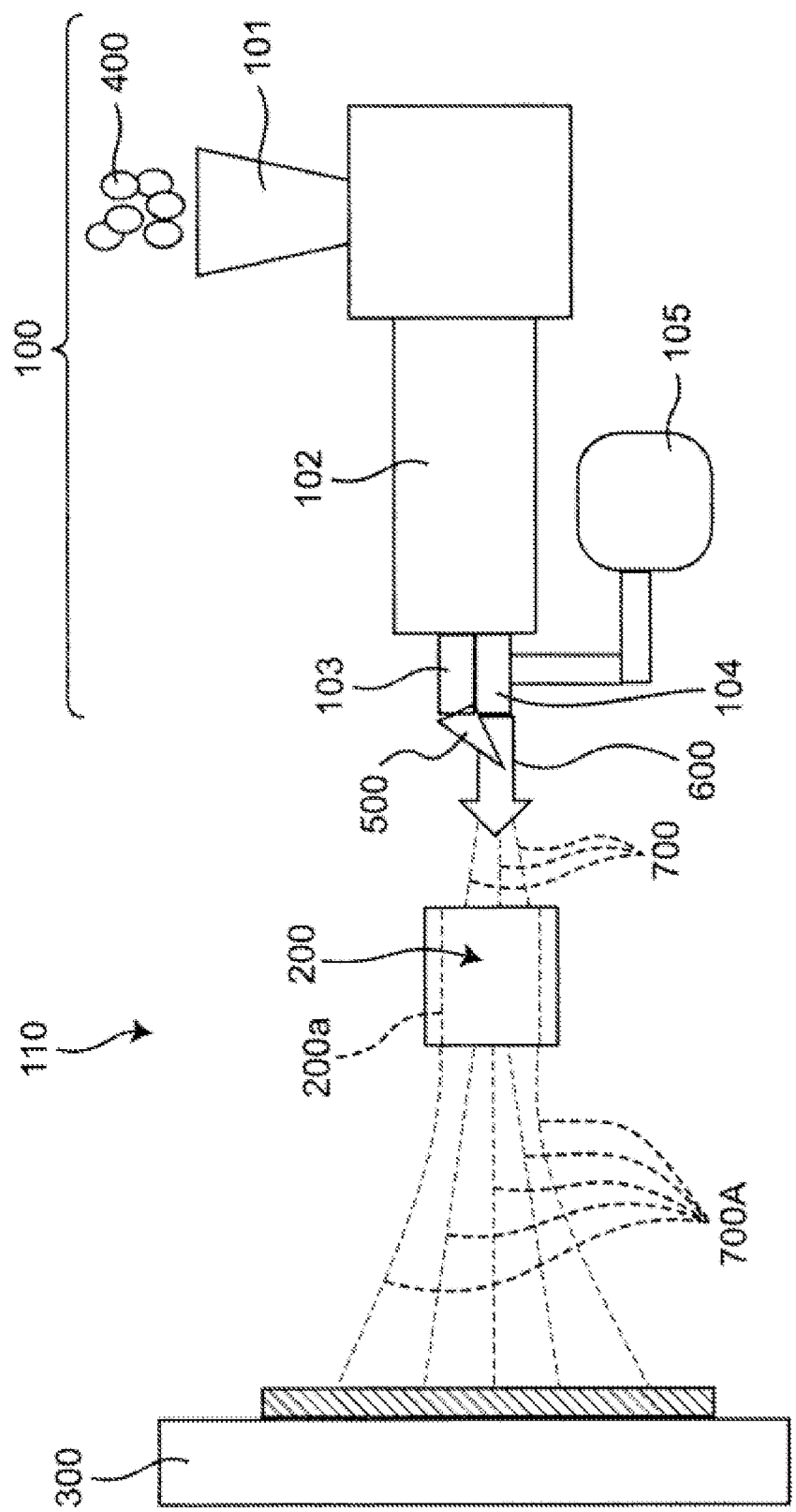
FIG. 1 is a schematic view for describing an example of an ultrafine fiber production device according to an embodiment of the present invention.

FIG. 1 illustrates an example of ultrafine fiber production device 110 according to the embodiment of the present invention. Ultrafine fiber production device 110 has melt spinning unit 100, second heating unit 200, and fiber collecting unit 300.

Melt spinning unit 100 for manufacturing fiber 700 from raw resin 400 is configured to include resin supply unit 101, first heating unit 102, nozzle unit 103, hot air generation device 105 serving as a hot air heating unit, and hot air blowing unit 104.

Resin supply unit 101 supplies raw resin 400 to first heating unit 102. For example, as raw resin 400, a thermoplastic resin such as a polypropylene resin, a polyester resin, a polyethylene resin, or a polyamide resin is used.

One end in an axial direction of first heating unit 102 is connected to resin supply unit 101, and first heating unit 102 melts raw resin 400 supplied from resin supply unit 101.

Nozzle unit 103 is disposed in the other end in the axial direction of first heating unit 102, and discharges melted resin 500 from nozzle hole 103a along the axial direction (a direction perpendicular to a vertical direction, that is, a horizontal direction, in other words, a spinning direction).

Hot air generation device 105 is disposed around nozzle unit 103, and generates high-temperature (for example, 400° C.) gas (for example, air). Here, an example of the high-temperature falls into a range of approximately 300° C. to 500° C. An example of the gas includes the air or nitrogen.

As an example, hot air blowing unit 104 is disposed in a lower portion of nozzle unit 103, and is connected to hot air generation device 105. As hot air 600, hot air blowing unit 104 blows the high-temperature gas generated by hot air generation device 105 from hot air blowing hole 104a along the axial direction (the direction perpendicular to the vertical direction, that is, the horizontal direction, in other words, the spinning direction). As a result, melted resin 500 discharged from nozzle hole 103a of nozzle unit 103 is extended once in the spinning direction by hot air 600 blown from hot air blowing hole 104a of hot air blowing unit 104, and is subjected to fiber forming, thereby becoming fiber 700.

Second heating unit 200 is disposed separately as far as fixed distance D2 in the axial direction of nozzle unit 103. Second heating unit 200 is a cylindrical heater whose central portion has through-hole 200a. Accordingly, when fiber 700 together with hot air 600 passes through through-hole 200a of second heating unit 200, fiber 700 is heated by the heater which is second heating unit 200. Fiber 700 subjected to fiber forming after being extended once by hot air 600 is further extended by a heating effect using second heating unit 200 and hot air 600, thereby becoming ultrafine fiber 700A.

Fiber collecting unit 300 is a plate-shaped member disposed separately as far as a certain fixed distance in the axial direction of second heating unit 200. Fiber collecting unit 300 collects ultrafine fiber 700A as a fiber assembly. Here, an example of the certain fixed distance includes a distance of approximately 30 cm. However, as long as collection is available, the example is not limited to this value.

Ultrafine fiber production device 110 having this configuration produces ultrafine fiber 700A by using an ultrafine fiber production method as follows.

First, raw resin 400 is supplied to first heating unit 102.

Next, supplied raw resin 400 is heated and melted by first heating unit 102.

Melted resin 500 melted by first heating unit 102 is supplied to nozzle unit 103, and is discharged from nozzle hole 103a of nozzle unit 103 in the axial direction (horizontal direction). In this case, simultaneously or prior to discharge, hot air 600 generated by hot air generation device 105 is blown from hot air blowing hole 104a of hot air blowing unit 104 in the axial direction (horizontal direction). According to this configuration, melted resin 500 discharged from nozzle hole 103a of nozzle unit 103 is extended once in the horizontal direction by hot air 600 blown from hot air blowing hole 104a of hot air blowing unit 104, and is subjected to fiber forming, thereby becoming fiber 700.

Next, fiber 700 together with hot air 600 passes through through-hole 200a of second heating unit 200. In this case, fiber 700 is heated by second heating unit 200. As a result, fiber 700 subjected to fiber forming after being extended once by hot air 600 is further extended in the horizontal direction by the heating effect using second heating unit 200 and hot air 600, thereby becoming ultrafine fiber 700A.

Next, ultrafine fiber 700A extended after fiber 700 passes through second heating unit 200 is collected as a fiber assembly by fiber collecting unit 300.

According to this configuration, fibrously melted resin 500 discharged from nozzle hole 103a of nozzle unit 103 is not vibrated, and fiber 700 is not gasified due to heating and extending performed by second heating unit 200. Therefore, a fiber assembly configured to include ultrafine fiber 700A having a thin and uniform fiber diameter can be produced from fibrously melted resin 500 discharged from nozzle hole 103a of nozzle unit 103 without any break in an easy and stable state.

Melt spinning unit 100, second heating unit 200, and fiber collecting unit 300 are disposed so that the spinning direction is the direction perpendicular to the vertical direction (horizontal direction). Therefore, there is no possibility of unstable spinning that fiber 700 coming into contact with a heater inner wall configuring through-hole 200a of second heating unit 200 may be melted again, may return to a flowable melted resin, and may stick to nozzle unit 103 or fiber collecting unit 300 in a non-fiber state.

Accordingly, spinning can be performed in a stable state without degrading quality.

Figure 2:
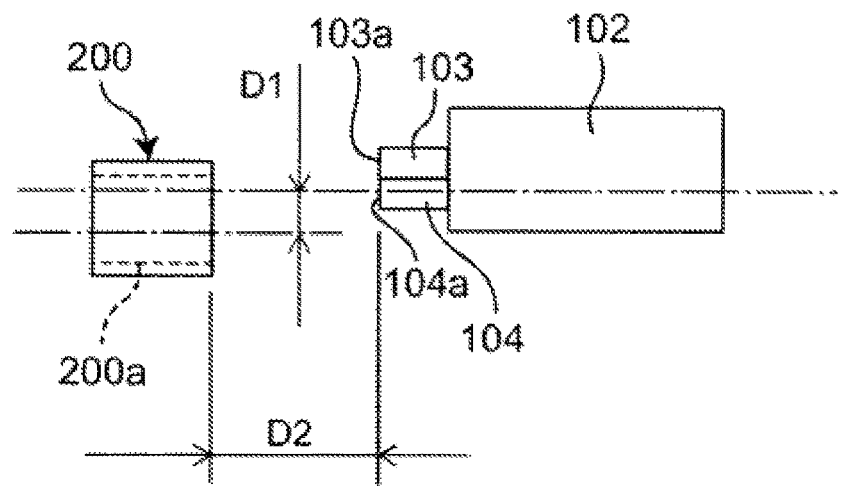
FIG. 2 is a schematic view for describing a position relationship among a nozzle unit, a hot air blowing unit, and a second heating unit of the ultrafine fiber production device illustrated in FIG. 1.

FIG. 2 is a schematic view illustrating a position relationship among nozzle unit 103, hot air blowing unit 104, and second heating unit 200. A center of through-hole 200a of second heating unit 200 is disposed at a position which is lower than a height of a center of hot air blowing hole 104a of hot air blowing unit 104 as much as distance D1 in the vertical direction.

Therefore, it is possible to reduce the influence that fiber 700 is lowered in a forward moving direction due to the self-weight of fiber 700. Therefore, fiber 700 is enabled to pass through through-hole 200a of a substantially central portion of second heating unit 200.

It is preferable that distance D1 is set to be in a range from 1 mm to 10 mm. If distance D1 is smaller than 1 mm, fiber 700 is likely to come into contact with a lower portion of the heater inner wall due to the influence that the fiber is lowered by gravity, and is melted again, thereby causing unstable spinning. In addition, if distance D1 exceeds 10 mm, the fiber cannot pass through the substantially central portion of the heater. In order to reduce the influence that fiber 700 is lowered in the forward moving direction (horizontal direction) due to the self-weight of fiber 700, second heating unit 200 may be installed so that the axial direction of second heating unit 200 is inclined downward in the direction of fiber collecting unit 300.

Furthermore, in FIG. 2, it is preferable that second heating unit 200 is separated as far as distance D2 in the axial direction (for example, the horizontal direction) from a distal end of nozzle unit 103 discharging melted resin 500 and a distal end of hot air blowing unit 104. According to this configuration, it is possible to restrain fiber 700 from being gasified by hot air 600, and it is possible to efficiently perform fine fiber forming.

Then, it is preferable that distance D2 is greater than 20 mm and is smaller than 100 mm. It is preferable that second heating unit 200 is disposed at a position separated as far as distance D2. That is, it is preferable that second heating unit 200 is disposed at a position which is farther than a position 20 mm away from nozzle unit 103 and hot air blowing unit 104 and closer than a position 100 mm away from nozzle unit 103 and hot air blowing unit 104. In a case where second heating unit 200 is as close as 20 mm or smaller to nozzle unit 103 and hot air blowing unit 104, there is a problem in that fiber 700 is gasified. On the other hand, in a case where second heating unit 200 is separated as far as 100 mm or greater from nozzle unit 103 and hot air blowing unit 104, fiber 700 is widely spread by hot air 600. Fiber 700 cannot pass through through-hole 200a of second heating unit 200. Even if fiber 700 can pass through through-hole 200a, fiber 700 is likely to come into contact with the heater inner wall. Therefore, fiber 700 is melted again, thereby causing unstable spinning.

In FIGS. 1 and 2, an example has been described in which nozzle unit 103 is disposed in an upper stage and hot air blowing unit 104 is disposed in a lower stage. However, nozzle unit 103 and hot air blowing unit 104 may be disposed upside down. Here, in a case where nozzle unit 103 is disposed in the upper stage and hot air blowing unit 104 is disposed in the lower stage, the melted resin is easily drawn into air by gravity. Accordingly, spinning can be stabilized. On the other hand, in a case where nozzle unit 103 and hot air blowing unit 104 are disposed upside down, when the spinning is stopped for maintenance work, it is possible to restrain the melted resin from flowing into and clogging hot air blowing unit 104.

In FIGS. 1 and 2, as second heating unit 200, a hollow (cylindrical) heater is used. In this manner, as illustrated in FIG. 1, hot air 600 together with fiber 700 can pass through the cylindrical through-hole 200a inside second heating unit 200.

Figure 3:
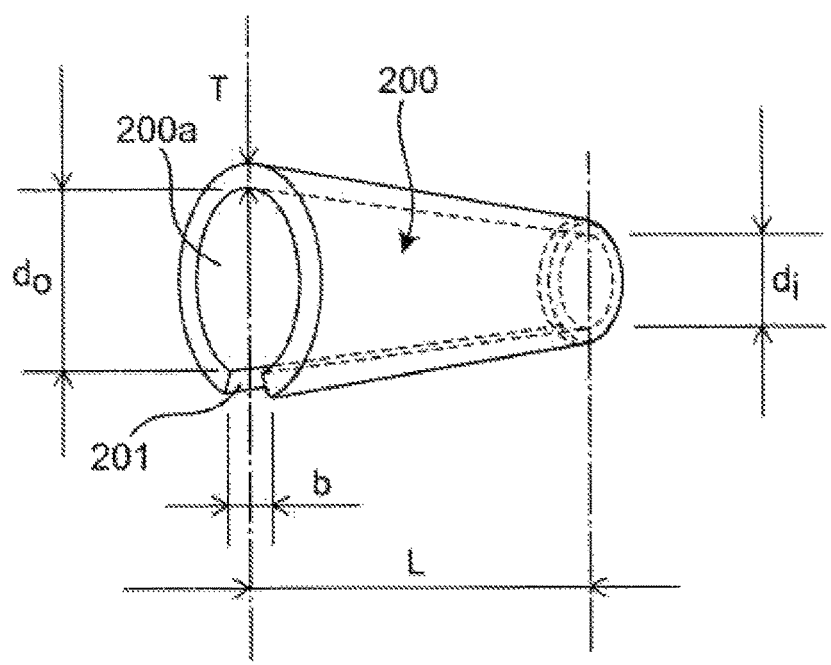
FIG. 3 is a schematic perspective view of the second heating unit illustrated in FIG. 2.

FIG. 3 illustrates an example of another shape of second heating unit 200. Second heating unit 200 illustrated in FIG. 3 gradually increases toward fiber collecting unit 300 illustrated in FIG. 1, from inner diameter di on an entrance side to inner diameter do on an exit side. The shape is preferably employed in order to stabilize a flow of fiber 700. In this case, through-hole 200a has a truncated conical shape enlarged from the entrance toward the exit.

In addition, it is preferable that slit-shaped cutout portion 201 extending from one end to the other end is disposed in at least a portion of a lower portion of second heating unit 200. Even in a case where fiber 700 coming into contact with the inner wall of second heating unit 200 is melted again, cutout portion 201 causes the melted resin to flow downward in the vertical direction from cutout portion 201 without the melted resin sticking to and staying at the lower portion of second heating unit 200. Therefore, there is no possibility that through-hole 200a may be closed by the melted resin and the spinning may be hindered. In this manner, the spinning can be performed in a stable state.

In addition, it is preferable that each heating temperature in first heating unit 102, hot air generation device 105, and second heating unit 200 which are illustrated in FIG. 1 is set to satisfy the following relationship.

first heating unit 102<hot air generation device 105<second heating unit 200

That is, it is preferable that the heating temperature in second heating unit 200 is set to be higher than the heating temperature in hot air generation device 105 serving as a hot air heating unit. It is preferable that the heating temperature in hot air generation device 105 is set to be higher than the heating temperature in first heating unit 102.

More specifically, it is preferable to satisfy a relationship of the heating temperature of melted resin 500 of first heating unit 102<the heating temperature of hot air 600 of hot air generation device 105<the heating temperature of the heater of second heating unit 200.

According to these settings, in a stage where raw resin 400 becomes fiber 700 through melted resin 500 and finally becomes ultrafine fiber 700A, it is possible to more reliably prevent raw resin 400, melted resin 500, and fiber 700 from being unpredictably gasified after being respectively and rapidly heated. In addition, raw resin 400, melted resin 500, and fiber 700 can be heated stepwise in this way. Accordingly, it is possible to more reliably produce the ultrafine fiber having a uniform fiber diameter.

According to the present embodiment, it is possible to restrain the resin from being gasified during a fining process, and it is possible to restrain a flow of the fiber from being disturbed due to a turbulent flow of the high-temperature gas (hot air 600). Therefore, a large amount of the ultrafine fiber having a uniform fiber diameter can be manufactured without any break in an easy and stable state.

Figure 4A:
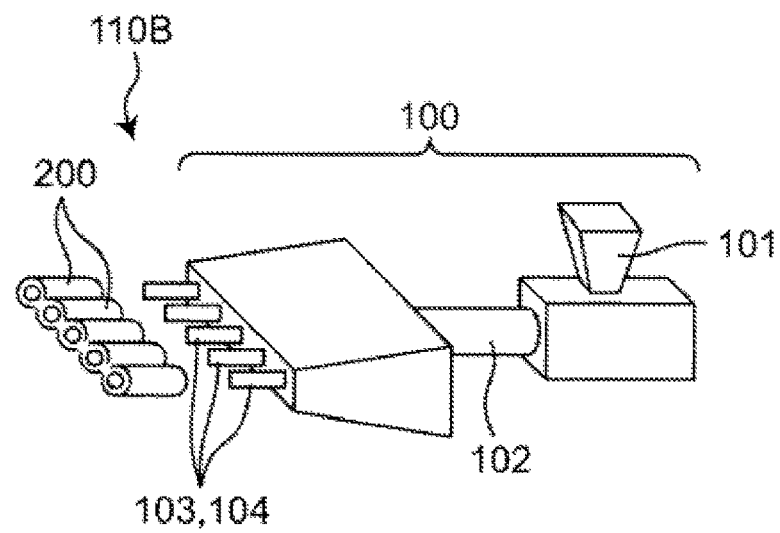
FIG. 4A is a schematic view for describing a device in which a plurality of nozzle unit, a plurality of hot air blowing units, and a plurality of second heating units are arranged according to the embodiment of the present invention.
Figure 4B:
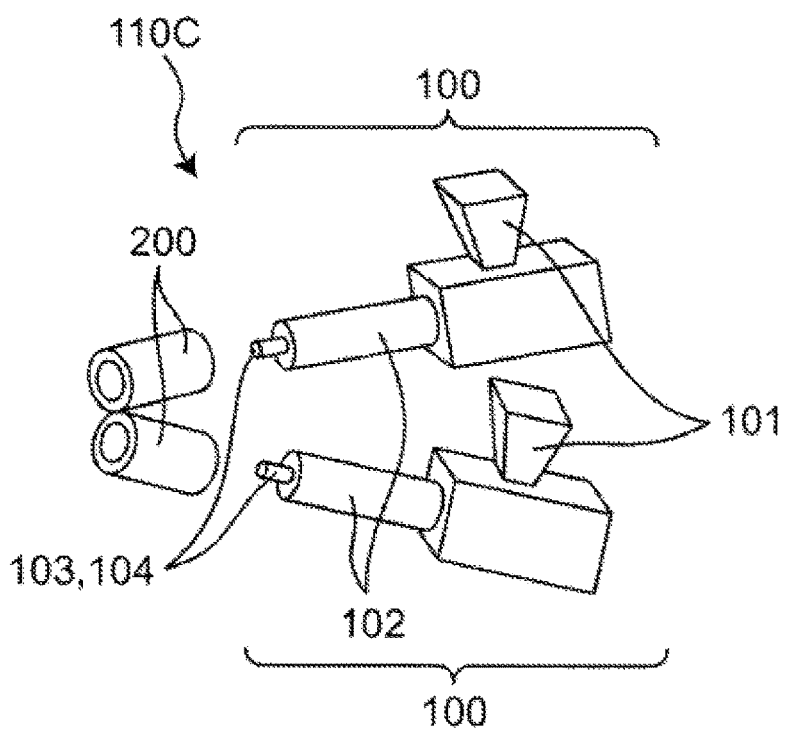
FIG. 4B is a schematic view for describing a device in which a plurality of melt spinning units and a plurality of second heating units are arranged according to the embodiment of the present invention.

FIGS. 4A and 4B illustrate an application example of ultrafine fiber production device 110 according to the present embodiment.

In ultrafine fiber production device 110B illustrated in FIG. 4A, a plurality of nozzle units 103, a plurality of hot air blowing units 104, and a plurality of second heating units 200 are respectively arranged in the vertical direction and/or in the horizontal direction, thereby configuring a multiplex nozzle. As an example, in FIG. 4A, all of these are respectively arranged in the horizontal direction, thereby configuring the multiplex nozzle. Then, the multiplex nozzle is connected to first heating unit 102. According to this configuration, a plurality of melted resin 500 can be simultaneously discharged from a plurality of nozzle units 103 at one time, and a plurality of hot airs 600 can be simultaneously blown from a plurality of hot air blowing units 104 at one time. As a result, it is possible to simultaneously produce a plurality of fibers 700 subjected to fiber forming after being extended once in the spinning direction. Since a type of the multiplex nozzle is configured in this way, productivity is improved.

In addition, in ultrafine fiber production device 110C illustrated in FIG. 4B, a plurality of melt spinning unit 100 and a plurality of second heating units 200 are arranged in the vertical direction and/or in the horizontal direction. As an example, in FIG. 4B, all of these are respectively arranged in the vertical direction. Melt spinning unit 100 has nozzle unit 103 and hot air blowing unit 104. Accordingly, even in this case, a plurality of nozzle units 103, a plurality of hot air blowing units 104, and a plurality of second heating units 200 are respectively arranged in the vertical direction, thereby configuring a multiplex nozzle. According to this configuration, a plurality of fibers formed of different resins or formed to have different fiber diameters can be combined with or stacked on each other.

In ultrafine fiber production device 110B illustrated in FIG. 4A, a plurality of fibers formed to have different fiber diameters by changing diameters of discharge ports of a plurality of nozzle units 103 to each other can also be combined with or stacked on each other. Alternatively, if first heating unit 102 is disposed for each of nozzle units 103, a plurality of fibers formed of different resins can be combined with or stacked on each other.

Hereinafter, an ultrafine fiber assembly and a manufacturing method thereof according to an application example in the embodiment of the present invention will be described in detail with reference to the drawings. An evaluation method in the application example employs the following method.

A. Fiber Production Amount

A fiber production amount is obtained as follows. That is, a total weight of fiber assemblies collected using a single nozzle per unit time (1 hour) by fiber collecting unit 300 is weighed using a precision balance, and the fiber production amount is calculated, based on the total weight. As the precision balance, BP210D manufactured by Satorius Intec is used.

B. Average Fiber Diameter and Fiber Diameter Variation

An average diameter of ultrafine fiber 700A is obtained as follows. That is, a diameter of an ultrafine fiber is measured from a surface observation image obtained using a scanning electron microscope, and an average value thereof is obtained. At this time, the number of ultrafine fibers used on the average is set to 10 or more randomly extracted within the same field of view. The diameters of the ultrafine fibers are measured. The ultrafine fibers are classified into 5 samples collected from different locations. A total of 50 or more ultrafine fibers are used to calculate the average fiber diameter. At this time, fiber diameter variation is also calculated as 3σ (three times the standard deviation). As the scanning electron microscope, VE7800 manufactured by Keyence Corporation is used.

C. Fiber Defect (Large)

Figure 5A:
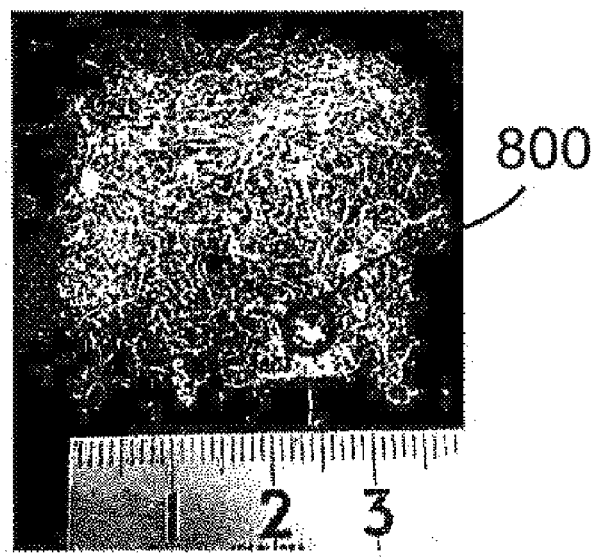
FIG. 5A is a view illustrating an observation image of a fiber defect (large) in an application example according to the embodiment of the present invention.

FIG. 5A is an image obtained by observing a state of the ultrafine fiber, and illustrates fiber defect (large) 800. Fiber defect (large) 800 is evaluated as follows. That is, in the fiber assembly collected by fiber collecting unit 300, a unit area (□100 mm) is subjected to visual observation and palpation. The number of huge bulk resins whose size is 1 mm or greater is counted, and fiber defect (large) 800 is evaluated, based on the number.

D. Fiber Defect (Small)

Figure 5B:
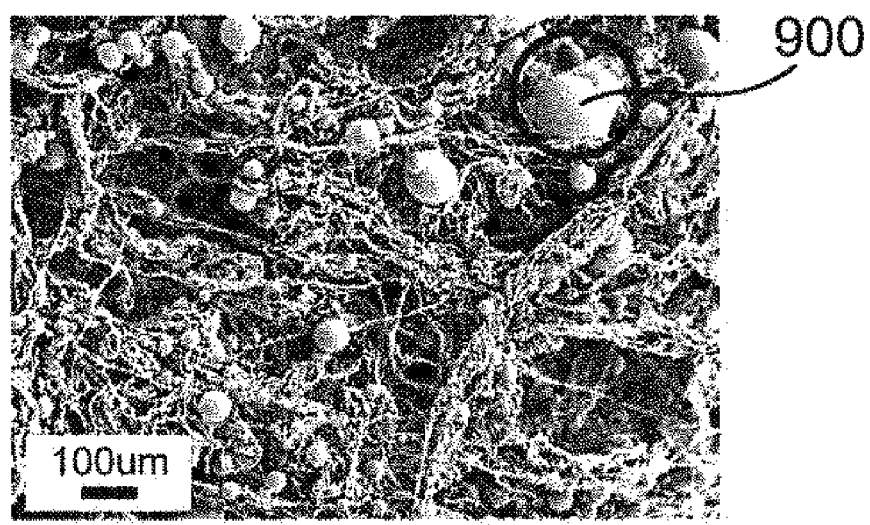
FIG. 5B is a view illustrating an observation image of a fiber defect (small), which is captured by a scanning electron microscope (SEM) in the application example according to the embodiment of the present invention.

FIG. 5B is an image obtained by observing a detailed state of the ultrafine fiber, and illustrates fiber defect (small) 900. Fiber defect (small) 900 is evaluated as follows. That is, the number of bulk resins having no fiber formed is counted from a surface image magnified 100 times using SEM, and fiber defect (small) 900 is evaluated, based on the number. At this time, the number of the bulk resins is counted in 5 images of 5 samples collected from different locations, and is calculated as a sum of five locations. As the scanning electron microscope, VE7800 manufactured by Keyence Corporation is used.

Hereinafter, an advantageous effect of the present invention will be described in detail with reference to application examples. However, the present invention is not limited these application examples.

Application Example 1

An ultrafine fiber assembly is manufactured using ultrafine fiber production device 110 illustrated in FIG. 1. Manufacturing conditions are as follows.
Raw Resin: polypropylene resin (melt flow rate (MFR): 1,200 g/10 minutes)
Spinning Direction: horizontal direction
First Heating Unit: setting temperature 300° C.
Hot Air Blowing Unit: setting temperature 400° C.
Second Heating Unit: setting temperature 500° C.
Hot Air Velocity: 200 m/sec
Distance D1: 5 mm
Distance D2: 50 mm
Heater Inner Diameter di-do: 30 mm to 30 mm
Heater Thickness T: 5 mm
Heater Length L: 40 mm
Heater Cutout Width b: 0 mm As a result, the manufactured ultrafine fiber assembly shows that the fiber production amount is 0.8 kg/h, the average fiber diameter is 345 nm, and the fiber diameter variation is ±40%. In addition, a result shows that the number of fiber defects (large) is 5 and the number of fiber defects (small) is 20.

Application Example 2

In Application Example 2, an ultrafine fiber assembly is also manufactured using ultrafine fiber production device 110 illustrated in FIG. 1. Manufacturing conditions are as follows. A point different from that in Application Example 1 is that a shape of second heating unit 200 employs a shape whose inner diameter gradually increases toward fiber collecting unit 300.
Raw Resin: polypropylene resin (melt flow rate (MFR): 1,200 g/10 minutes)
Spinning Direction: horizontal direction
First Heating Unit: setting temperature 300° C.
Hot Air Blowing Unit: setting temperature 400° C.
Second Heating Unit: setting temperature 500° C.
Hot Air Velocity: 200 m/sec
Distance D1: 5 mm
Distance D2: 50 mm
Heater Inner Diameter di-do: 30 mm to 60 mm
Heater Thickness T: 5 mm
Heater Length L: 40 mm
Heater Cutout Width b: 0 mm As a result, in the manufactured ultrafine fiber assembly, the fiber production amount is 0.8 kg/h which is substantially the same as that in Application Example 1. However, the average fiber diameter becomes as thin as 307 nm, and the fiber diameter variation can be minimized to ±28%. In addition, the number of fiber defects (large) is three, and the number of fiber defects (small) is five. Compared to Application Example 1, the obtained result shows that the number tends to decrease.

Application Example 3

In Application Example 3, an ultrafine fiber assembly is also manufactured using ultrafine fiber production device 110 illustrated in FIG. 1. Manufacturing conditions are as follows. A point different from that in Application Example 1 is that a shape of second heating unit 200 employs a shape which has cutout portion 201 in a heater lower portion. In Application Example 3, as a shape of cutout portion 201, a cutout is formed in a shape having a cutout width b and penetrating over heater length L. However, without being limited thereto, it is possible to employ a shape having the cutout portion in at least a portion of the heater lower portion.

Raw Resin: polypropylene resin (melt flow rate (MFR): 1,200 g/10 minutes)
  Spinning Direction: horizontal direction
  First Heating Unit: setting temperature 300° C.
  Hot Air Blowing Unit: setting temperature 400° C.
  Second Heating Unit: setting temperature 500° C.
  Hot Air Velocity: 200 m/sec
  Distance D1: 5 mm
  Distance D2: 50 mm
  Heater Inner Diameter di-do: 30 mm to 30 mm
  Heater Thickness T: 5 mm
  Heater Length L: 40 mm
  Heater Cutout Width b: 5 mm As a result, in the manufactured ultrafine fiber assembly, the fiber production amount is 0.8 kg/h which is substantially the same as that in Application Example 1. The average fiber diameter and the fiber diameter variation are respectively 355 nm and ±38% which are approximately the same as those in Application Example 1. However, the number of fiber defects (large) is zero, and the number of fiber defects (small) is one. Compared to Application Example 1, the obtained result shows that the number can be considerably decreased.

Comparative Example 1

As Comparative Example 1, second heating unit 200 is not provided. Except for that, an ultrafine fiber assembly is manufactured using a device the same as the ultrafine fiber production device illustrated in FIG. 1. Manufacturing conditions are as follows.

Raw Resin: polypropylene resin (melt flow rate (MFR): 1,200 g/10 minutes)
  Spinning Direction: horizontal direction
  First Heating Unit: setting temperature 300° C.
  Hot Air Blowing Unit: setting temperature 400° C.
  Second Heating Unit: not provided As a result, in the manufactured ultrafine fiber assembly, the fiber production amount is 0.8 kg/h which is approximately the same as that in Application Examples 1 to 3. However, the average fiber diameter is 807 nm which is thicker than those in Application Examples 1 to 3. Furthermore, the fiber diameter variation is ±64% which is greater than those in Application Examples 1 to 3. In addition, the result shows that the number of fiber defects (large) is six and the number of fiber defects (small) is 18.

Comparative Example 2

As Comparative Example 2, the spinning direction is set to the vertical direction. Except for that, an ultrafine fiber assembly is manufactured using a device the same as the ultrafine fiber production device illustrated in FIG. 1. Manufacturing conditions are as follows. However, distance D1 between second heating unit 200 and hot air blowing unit 104 is set to 0 mm since the vertical direction does not receive the influence of gravity.

Raw Resin: polypropylene resin (melt flow rate (MFR): 1,200 g/10 minutes)
  Spinning Direction: vertical direction (downward)
  First Heating Unit: setting temperature 300° C.
  Hot Air Blowing Unit: setting temperature 400° C.
  Second Heating Unit: setting temperature 500° C.
  Hot Air Velocity: 200 m/sec
  Distance D1: 0 mm
  Distance D2: 50 mm
  Heater Inner Diameter di-do: 30 mm to 30 mm
  Heater Thickness T: 5 mm
  Heater Length L: 40 mm
  Heater Cutout Width b: 0 mm As a result, in the manufactured ultrafine fiber assembly, the fiber production amount, the average fiber diameter, and the fiber diameter variation are approximately the same as those in Application Example 1. These are respectively 0.8 kg/h, 353 nm, and ±42%. However, the number of fiber defects (large) and the number of fiber defects (small) are 52 and 105. The result shows that the number is considerably increased compared to that in Application Example 1.

Comparative Example 3

As Comparative Example 3, an ultrafine fiber assembly is manufactured using the ultrafine fiber production device illustrated in FIG. 1. Manufacturing conditions are as follows. A point different from that in Application Example 1 is that distance of D1 between second heating unit 200 and hot air blowing unit 104 is set to 0 mm.

Raw Resin: polypropylene resin (melt flow rate (MFR): 1,200 g/10 minutes)
  Spinning Direction: horizontal direction
  First Heating Unit: setting temperature 300° C.
  Hot Air Blowing Unit: setting temperature 400° C.
  Second Heating Unit: setting temperature 500° C.
  Hot Air Velocity: 200 m/sec
  Distance D1: 0 mm
  Distance D2: 50 mm
  Heater Inner Diameter di-do: 30 mm to 30 mm
  Heater Thickness T: 5 mm
  Heater Length L: 40 mm
  Heater Cutout Width b: 0 mm As a result, in the manufactured ultrafine fiber assembly, compared to Application Example 1, the fiber production amount decreases to 0.5 kg/h. The average fiber diameter is 360 nm which is approximately the same as that in Application Example 1. However, the result shows that the fiber diameter variation is ±53% which is degraded compared to Application Example 1. In addition, the number of fiber defects (large) is five which is approximately the same as that in Application Example 1. However, the number of fiber defects (small) considerably increases to 60 compared to that in Application Example 1.

Comparative Example 4

As Comparative Example 4, an ultrafine fiber assembly is manufactured using the ultrafine fiber production device illustrated in FIG. 1. Manufacturing conditions are as follows. A point different from that in Application Example 1 is that second heating unit 200 is disposed as close as distance D2 of 20 mm from nozzle unit 103 discharging the melted resin and hot air blowing unit 104.

Raw Resin: polypropylene resin (melt flow rate (MFR): 1,200 g/10 minutes)
  Spinning Direction: horizontal direction First Heating Unit: setting temperature 300° C.
Hot Air Blowing Unit: setting temperature 400° C.
Second Heating Unit: setting temperature 500° C.
Hot Air Velocity: 200 m/sec
Distance D1: 5 mm
Distance D2: 20 mm
Heater Inner Diameter di-do: 30 mm to 30 mm
Heater Thickness T: 5 mm
Heater Length L: 40 mm
Heater Cutout Width b: 0 mm As a result, in the manufactured ultrafine fiber assembly, compared to Application Example 1, the fiber production amount considerably decreases to 0.3 kg/h. The result shows that the average fiber diameter becomes larger and the fiber diameter variation is degraded. The average fiber diameter and the fiber diameter variation are respectively 530 nm and ±55%. In addition, the number of fiber defects (large) is four which is approximately the same as that in Application Example 1. However, the number of fiber defects (small) considerably increases to 35.

Comparative Example 5

As Comparative Example 5, an ultrafine fiber assembly is manufactured using the ultrafine fiber production device illustrated in FIG. 1. Manufacturing conditions are as follows. A point different from that in Application Example 1 is that second heating unit 200 is disposed as far as distance D2 of 100 mm from nozzle unit 103 discharging the melted resin and hot air blowing unit 104.

Raw Resin: polypropylene resin (melt flow rate (MFR): 1,200 g/10 minutes)
Spinning Direction: horizontal direction
First Heating Unit: setting temperature 300° C.
Hot Air Blowing Unit: setting temperature 400° C.
Second Heating Unit: setting temperature 500° C.
Hot Air Velocity: 200 m/sec
Distance D1: 5 mm
Distance D2: 100 mm
Heater Inner Diameter di-do: 30 mm to 30 mm
Heater Thickness T: 5 mm
Heater Length L: 40 mm
Heater Cutout Width b: 0 mm As a result, in the manufactured ultrafine fiber assembly, compared to Application Example 1, the fiber production amount is 0.8 kg/h which is approximately the same as that in Application Example 1. However, the result shows that the average fiber diameter becomes larger and the fiber diameter variation is degraded. The average fiber diameter and the fiber diameter variation are respectively 610 nm and ±89%. In addition, the number of fiber defects (large) is seven which is approximately the same as that in Application Example 1. However, the number of fiber defects (small) considerably increases to 57.

Comparative Example 6

As Comparative Example 6, an ultrafine fiber assembly is manufactured using the ultrafine fiber production device illustrated in FIG. 1. Manufacturing conditions are as follows. A point different from that in Application Example 1 is that a setting temperature of hot air blowing unit 104 is set to be equal to or higher than a setting temperature of second heating unit 200.

Raw Resin: polypropylene resin (melt flow rate (MFR): 1,200 g/10 minutes)
Spinning Direction: horizontal direction First Heating Unit: setting temperature 300° C.
Hot Air Blowing Unit: setting temperature 500° C.
Second Heating Unit: setting temperature 500° C.
Hot Air Velocity: 200 m/sec
Distance D1: 5 mm
Distance D2: 50 mm
Heater Inner Diameter di-do: 30 mm to 30 mm
Heater Thickness T: 5 mm
Heater Length L: 40 mm
Heater Cutout Width b: 0 mm As a result, in the manufactured ultrafine fiber assembly, compared to Application Example 1, the fiber production amount considerably decreases to 0.1 kg/h. However, the average fiber diameter and the fiber diameter variation are respectively 358 nm and ±43% which are approximately the same as those in Application Example 1. In addition, the number of fiber defects (large) is five which is approximately the same as that in Application Example 1. However, the number of fiber defects (small) considerably increases to 150.

These results are collectively illustrated in Table 1.

TABLE 1

| | A | B | | C | D |
|---|---|---|---|---|---|
| | Fiber Generation Amount (kg/h) | Average Fiber Diameter (nm) | Fiber Diameter Variation (%) | Fiber Defect (Large) | Fiber Defect (Small) |
| Application Example 1 | 0.8 | 345 | ±40 | 5 | 20 |
| Application Example 2 | 0.8 | 307 | ±28 | 3 | 5 |
| Application Example 3 | 0.8 | 355 | ±38 | 0 | 1 |
| Comparative Example 1 | 0.8 | 807 | ±64 | 6 | 18 |
| Comparative Example 2 | 0.8 | 353 | ±42 | 52 | 102 |
| Comparative Example 3 | 0.5 | 360 | ±53 | 5 | 60 |
| Comparative Example 4 | 0.3 | 530 | ±55 | 4 | 35 |
| Comparative Example 5 | 0.8 | 610 | ±89 | 7 | 57 |
| Comparative Example 6 | 0.1 | 358 | ±43 | 5 | 150 |

Figure 6:
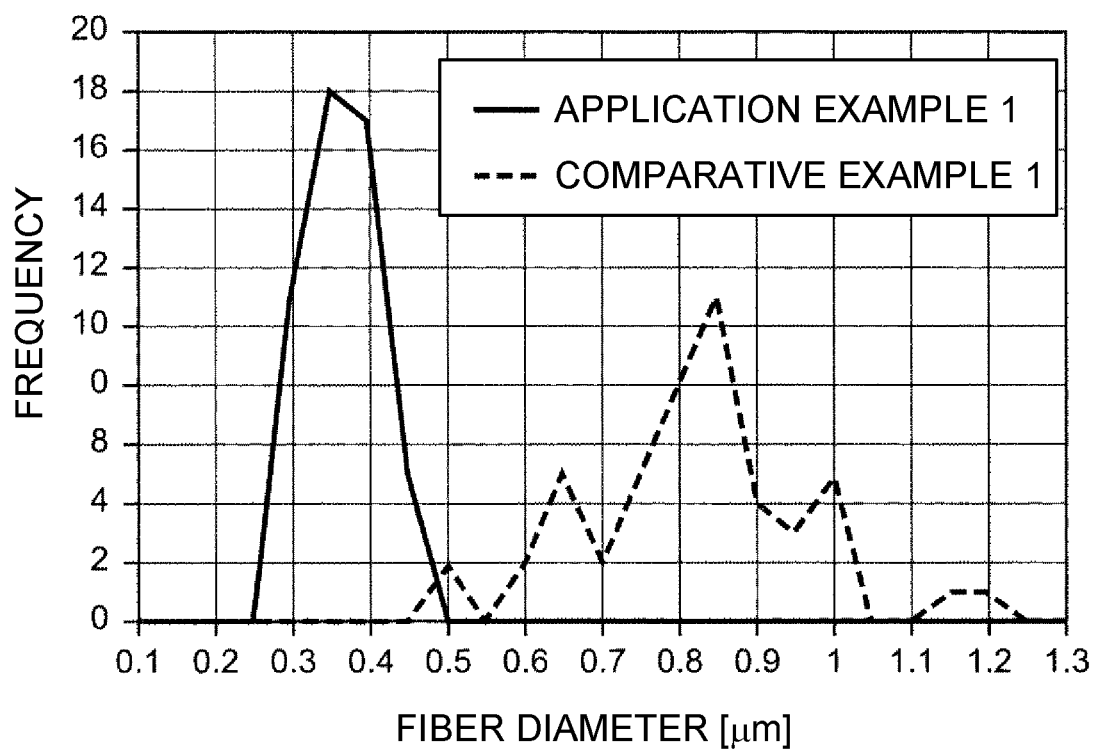
FIG. 6 is a view for comparing fiber diameter distribution in Application Example 1 and fiber diameter distribution in Comparative Example 1 according to the embodiment of the present invention.

In addition, FIG. 6 illustrates a distribution graph prepared, based on results of measuring fiber diameters in Application Example 1 and Comparative Example 1. If Application Example 1 and Comparative Example 1 are compared with each other from Table 1, it is understood that second heating unit 200 in Application Example 1 can considerably decrease fine fiber forming and the fiber diameter variation without decreasing the fiber production amount. However, in Application Example 1, a case has been described where the thickness of the ultrafine fiber is 1 μm or smaller. However, even if the thickness of the fiber is 1 μm or larger, an advantageous effect according to the present invention can be expected. Then, based on the fiber diameter distribution illustrated in FIG. 6, it is understood that the fiber diameter in Application Example 1 can become thinner and the fiber diameter variation can be minimized.

In Application Example 2, the shape of through-hole 200a of second heating unit 200 is caused to gradually increase toward fiber collecting unit 300. In this manner, a flow of fiber 700 can be stabilized. In addition, it is possible to restrain fiber 700 from being melted again after coming into contact with the heater inner wall. Therefore, it is understood that the fiber production amount can be increased, that the fiber diameter can become further thinner, and that the fiber diameter variation can be minimized. In addition, owing to the same advantageous effect, the number of fiber defects (small) can be reduced.

In Application Example 3, cutout portion 201 is disposed in the heater lower portion of second heating unit 200. Accordingly even in a case where fiber 700 coming into contact with the heater inner wall is melted again, the flowable melted resin flows down without sticking to and staying at the heater lower portion. Therefore, there is no possibility that the hollow portion of the heater may be closed by the melted resin and the spinning may be hindered. Therefore, the spinning can be performed in a stable state, and it is possible to considerably restrain occurrence of the fiber defect (large) and the fiber defect (small).

In Comparative Example 2, the spinning direction is disposed so as to be the vertical direction (downward). According to this configuration, in Comparative Example 2, fiber 700 coming into contact with the heater inner wall of second heating unit 200 is melted again. The flowable melted resin in a non-fiber state falls down onto fiber collecting unit 300, and sticks to the ultrafine fiber assembly. Therefore, as illustrated in Table 1, the result in Comparative Example 2 shows that the number of fiber defects (large) as illustrated in FIG. 5A increases compared to Application Example 1. In Comparative Example 2, the spinning is performed downward. However, in a case where the spinning is performed upward, the similarly flowable melted resin in a non-fiber state sticks to nozzle unit 103 and hot air blowing unit 104. Therefore, the spinning is unstabilized. As a result, similarly to a case where the spinning is performed downward, the number of fiber defects (large) increases as illustrated in FIG. 5A. In some cases, the number of fiber defects (small) also increases as illustrated in FIG. 5B.

In Comparative Example 3, second heating unit 200 is configured so that distance D1 which is a height difference between hot air blowing unit 104 and second heating unit 200 is disposed at the same height. According to this configuration, due to the influence that the fiber is lowered by gravity, fiber 700 is likely to come into contact with the heater inner wall configuring through-hole 200a of second heating unit 200, particularly, the heater lower portion. Therefore, fiber 700 is melted again, and the fiber production amount decreases. Due to the flowable melted resin, fiber forming becomes unstable. As a result, as illustrated in Table 1, the result in Comparative Example 3 shows that the fiber diameter variation increases compared to Application Example 1, and that the number of fiber defects (small) also increases.

Comparative Example 4 adopts a configuration in which second heating unit 200 is disposed as close as distance D2 of 20 mm or shorter from nozzle unit 103 discharging the melted resin and hot air blowing unit 104. According to this configuration, fiber 700 is likely to be heated by nozzle unit 103 and hot air blowing unit 104, and is gasified. Therefore, as illustrated in Table 1, the fiber production amount in Comparative Example 4 decreases compared to Application Example 1, and fiber forming becomes unstable. The fiber diameter variation increases, and the number of fiber defects (small) also increases. Furthermore, in view of this result, the present inventors have confirmed a tendency that if distance D2 is father than 20 mm, the influence is reduced. On the other hand, if distance D2 is closer than 20 mm or shorter, the degraded result is obtained.

Comparative Example 5 adopts a configuration in which second heating unit 200 is disposed in a state of being separated as far as distance D2 of 100 mm or longer from nozzle unit 103 discharging the melted resin and hot air blowing unit 104. According to this configuration, fiber 700 is widely spread by hot air 600. Fiber 700 cannot pass through through-hole 200a of second heating unit 200. Even if fiber 700 can pass through through-hole 200a, fiber 700 is likely to come into contact with the heater inner wall. Therefore, fiber 700 is melted again, and the spinning becomes unstable. As illustrated in Table 1, the fiber production amount in Comparative Example 5 decreases compared to Application Example 1, fiber forming becomes unstable. As a result, the fiber diameter variation increases, and the number of fiber defects (small) also increases. Furthermore, in view of this result, the present inventors have confirmed a tendency that if distance D2 is closer than 100 mm, the influence is reduced. On the other hand, if distance D2 is farther than 100 mm or longer, the degraded result is obtained.

Comparative Example 6 adopts a configuration in which the temperature of hot air blowing unit 104 is set to be equal to or higher than the setting temperature of second heating unit 200. According to this configuration, melted resin 500 is rapidly heated at the temperature of hot air 600, and is gasified. Consequently, fiber forming cannot be efficiently performed. Therefore, the fiber production speed becomes slower, and the spinning becomes unstable. Accordingly, as illustrated in Table 1, the result in Comparative Example 6 shows that the number of fiber defects (small) also increases compared to Application Example 1. In addition, the present inventors have confirmed that in a case where the temperature of first heating unit 102 is set to be equal or higher than the setting temperature of hot air blowing unit 104 or second heating unit 200, the melted resin is similarly gasified, and the spinning becomes unstable. Therefore, the heating temperature in first heating unit 102, hot air generation device 105, and second heating unit 200 is set so as to satisfy a relationship that the heating temperature is higher in the order of the heating temperature of melted resin 500 of first heating unit 102<the heating temperature of hot air 600 of hot air generation device 105<the heating temperature of the heater of second heating unit 200. According to this configuration, the present inventors have found that the above-described setting is a condition under which ultrafine fiber 700A can be more stably generated without gasifying the melted resin.

Any optional embodiments or modification examples in the above-described embodiments or modification examples can be appropriately combined with each other. In this manner, it is possible to achieve an advantageous effect belonging to each embodiment and each modification example. In addition, a combination between the embodiments, a combination between the application examples, or a combination between the embodiment and the application example can be adopted. A combination between characteristics included in different embodiments or different application examples can also be adopted.

INDUSTRIAL APPLICABILITY

According to an ultrafine fiber production method and an ultrafine fiber production device in aspects of the present invention, it is possible to restrain a resin from being gasified during a fining process, and it is possible to restrain a flow of fibers from being disturbed due to a turbulent flow generated by high-temperature gas. Therefore, a large amount of ultrafine fibers having a thin and uniform fiber diameter can be manufactured without any break in an easy and stable state.

The invention claimed is:

1. An ultrafine fiber production device comprising:
   a first heating unit that melts a thermoplastic resin;
   a nozzle unit that discharges the thermoplastic resin melted by the first heating unit;
   a hot air heating unit that produces high-temperature gas;
   a hot air blowing unit that performs fiber forming by extending the melted thermoplastic resin after blowing the high-temperature gas produced by the hot air heating unit to the melted thermoplastic resin discharged by the nozzle unit;
   a second heating unit that has a through-hole which allows the thermoplastic resin subjected to fiber forming by the hot air blowing unit to pass through for heating, and that further fines the thermoplastic resin subjected to fiber forming by heating the thermoplastic resin subjected to fiber forming when the thermoplastic resin subjected to fiber forming passes the through-hole; and
   a fiber collecting unit that collects the thermoplastic resin in a fibrous form which is fined by the second heating unit,
   wherein a spinning direction in which the thermoplastic resin moves is a direction perpendicular to a vertical direction,
   wherein the hot air blowing unit has a hot air blowing hole which ejects the high-temperature gas, and
   wherein in the vertical direction, a center of the through-hole of the second heating unit is lower than the hot air blowing hole of the hot air blowing unit.

2. The ultrafine fiber production device of claim 1, wherein the second heating unit is disposed at a position which is farther than a position 20 mm away from the nozzle unit and the hot air blowing unit and closer than a position 100 mm away from the nozzle unit and the hot air blowing unit.

3. The ultrafine fiber production device of claim 2, wherein an inner diameter of the second heating unit increases toward the fiber collecting unit.

4. The ultrafine fiber production device of claim 3, wherein a cutout portion is disposed in at least a portion of a lower portion of the second heating unit.

5. The ultrafine fiber production device of claim 1, wherein a heating temperature in the second heating unit is set to be higher than a heating temperature in the hot air heating unit, and the heating temperature in the hot air heating unit is set to be higher than a heating temperature in the first heating unit.

6. The ultrafine fiber production device of claim 5, wherein a plurality of the nozzle units, a plurality of the hot air blowing units, and a plurality of the second heating units are arranged so as to configure multiplex nozzle, and the multiplex nozzle is connected to the first heating unit.

7. The ultrafine fiber production device of claim 6, wherein a plurality of fibers formed of different resins or formed to have different fiber diameters are combined with or stacked on each other by the multiplex nozzle.

8. An ultrafine fiber production method comprising:
   a step of melting a thermoplastic resin;
   a step of discharging the melted thermoplastic resin from a nozzle unit along a horizontal direction, and performing fiber forming by extending the melted thermoplastic resin after blowing high-temperature gas from a hot air blowing hole along a spinning direction to the melted thermoplastic resin discharged by the nozzle unit;
   a step of further fining the thermoplastic resin by heating the thermoplastic resin subjected to fiber forming by passing through a through-hole inside a cylindrical heater; and
   a step of collecting the thermoplastic resin fined fibrously,
   wherein a spinning direction in which the thermoplastic resin moves is a direction perpendicular to a vertical direction, and
   wherein a center of the through-hole of the cylindrical heater is lower than the hot air blowing hole in the vertical direction.

9. The ultrafine fiber production device of claim 1, wherein a vertical direction between a center of the hot air blowing hole and a center of the through-hole is in a range from 1 mm to 10 mm.

10. The ultrafine fiber production device of claim 1, wherein the second heating unit is a cylindrical heater.

11. The ultrafine fiber production device of claim 1, wherein the high-temperature gas is blown along a horizontal direction from the hot air blowing hole.

* * * * *